United States Patent
James et al.

(10) Patent No.: US 7,073,018 B1
(45) Date of Patent: Jul. 4, 2006

(54) DEVICE IDENTIFICATION METHOD FOR SYSTEMS HAVING MULTIPLE DEVICE BRANCHES

(75) Inventors: David V. James, Palo Alto, CA (US); Jagadeesan Rajamanickam, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 319 days.

(21) Appl. No.: 10/331,673

(22) Filed: Dec. 26, 2002

Related U.S. Application Data

(60) Provisional application No. 60/343,973, filed on Dec. 27, 2001.

(51) Int. Cl.
*G06F 12/00* (2006.01)
(52) U.S. Cl. .................................................. 711/108
(58) Field of Classification Search .................. 711/108
See application file for complete search history.

(56) References Cited

U.S. PATENT DOCUMENTS

| | | | |
|---|---|---|---|
| 4,646,300 A * | 2/1987 | Goodman et al. ........... | 714/749 |
| 5,422,885 A * | 6/1995 | Nadkarni ..................... | 370/451 |
| 5,548,559 A * | 8/1996 | Mochizuki et al. ..... | 365/230.08 |
| 5,734,819 A | 3/1998 | Lewis | |
| 5,860,080 A * | 1/1999 | James et al. .................... | 711/4 |
| 5,930,359 A | 7/1999 | Kempke et al. | |
| 5,935,229 A * | 8/1999 | Duval et al. ................. | 710/105 |
| 5,952,934 A * | 9/1999 | Matsumoto et al. ... | 340/825.52 |
| 6,600,686 B1* | 7/2003 | Huh et al. ................... | 365/201 |
| 2003/0084219 A1* | 5/2003 | Yao et al. .................... | 710/300 |
| 2004/0174753 A1* | 9/2004 | Nakano et al. ............. | 365/200 |

OTHER PUBLICATIONS

U.S. Appl. No. 10/109,364, Not Published, James et al.
U.S. Appl. No. 10/329,246, Not Published, James et al.
"IEEE Standard for Scalable Coherent Interface (SCI)", *IEEE Std 1596-1992*, Institute of Electrical and Electronic Engineers, Inc., New York, NY, pp. 4-25 and 47-72, May 23, 2001.

* cited by examiner

*Primary Examiner*—Pierre Bataille
*Assistant Examiner*—Sheng-Jen Tsai

(57) ABSTRACT

A method for assigning chip identification (ID) values is disclosed. Unique chip ID values may be assigned to chips (106-0 to 106-5) in a system (100) having multiple branches (112-0 and 112-1). After chip IDs have been assigned to chips of a first branch (112-0) a command processing system (104) may issue an end of branch indication. Chip IDs may then be assigned to chips of a next branch (112-1).

20 Claims, 6 Drawing Sheets

| CODE | RESP | STAT | PRIORITY | CHIP | DATA1 | DATA2 | DATA3 |
FIG. 4
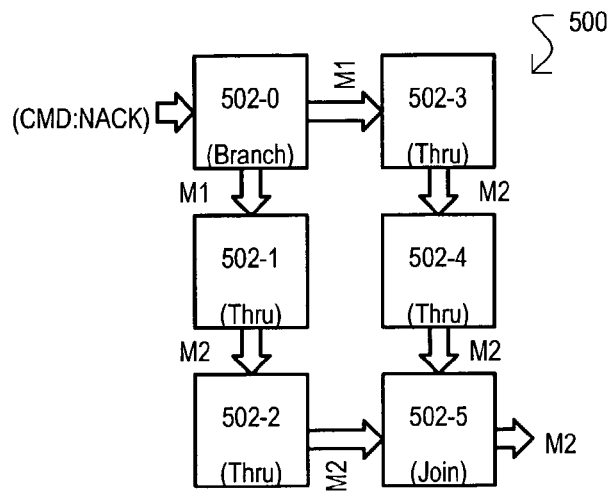
FIG. 5
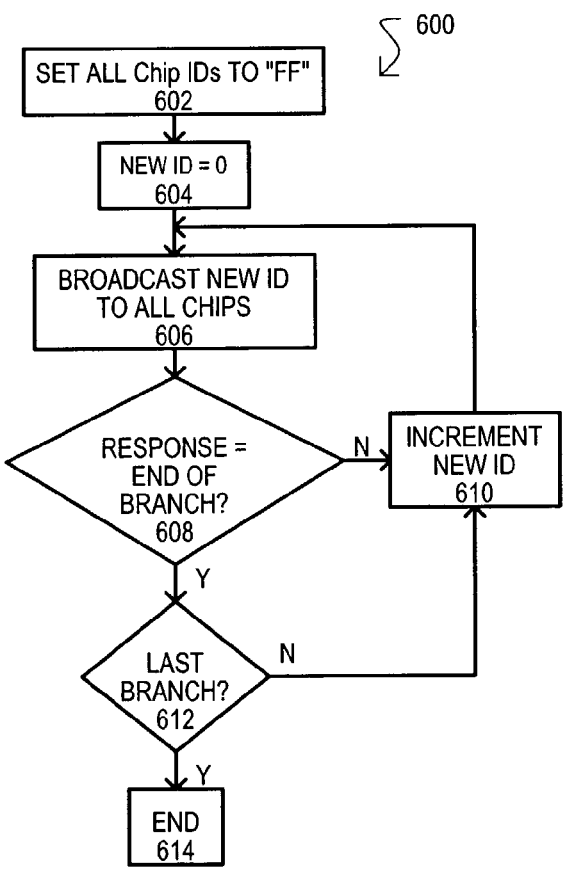
FIG. 6

| CLEAR ID (CID) ||||||||||
| Old State ||| Command ||| New State || Response ||
| MODE | SOP | ChipID | Chip | CMD Stat0 | CMD Stat1 | SOP | ChipID | Stat0 | Stat1 |
| --- | --- | --- | --- | --- | --- | --- | --- | --- | --- |
| --- | --- | --- | --- | --- | --- | 0 | FF | M0 | M0 |

FIG. 7

| ASSIGN ID (AID) |||||||||||
| ROW | Old State ||| Command ||| New State || Response ||
| | MODE | SOP | ChipID | Chip | CMD Stat0 | CMD Stat1 | SOP | ChipID | Stat0 | Stat1 |
| --- | --- | --- | --- | --- | --- | --- | --- | --- | --- | --- |
| A | BRANCH | 0 | FF | FF | NACK | | 1 | NewID | M1 | M2 |
| B | BRANCH | 0 | --- | ChipID | NACK | | 0 | NewID | M1 | M1 |
| C | BRANCH | 0 | --- | --- | --- | | 0 | ChipID | none | none |
| D | BRANCH | 1 | --- | ChipID | NACK | | 0 | NewID | M1 | M2 |
| E | BRANCH | 1 | --- | --- | --- | | 1 | ChipID | | |
| F | THRU | --- | | ChipID | NACK | | 0 | NewID | M1 | |
| G | THRU | --- | | --- | --- | | 0 | ChipID | none | |
| H | JOIN | 0 | FF | FF | ACK1 | --- | 1 | ChipID | M2 | |
| I | JOIN | 0 | | | --- | ACK1 | | | | |
| J | JOIN | 0 | --- | ChipID | NACK | NACK | 0 | NewID | M1 | |
| K | JOIN | 0 | --- | --- | --- | --- | 0 | ChipID | none | |
| L | JOIN | 1 | --- | --- | --- | --- | 0 | ChipID | M3 | |

FIG. 8

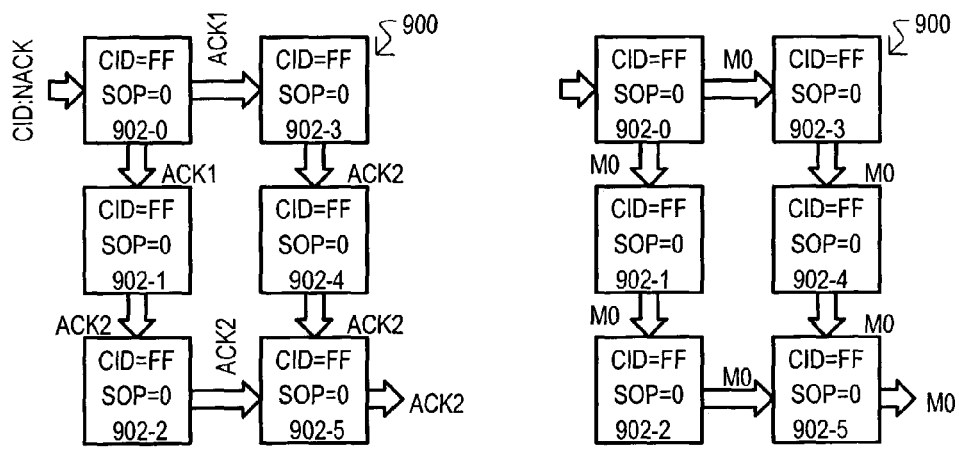

DEVICE IDENTIFICATION METHOD FOR SYSTEMS HAVING MULTIPLE DEVICE BRANCHES

This application claims the benefit of provisional application Ser. No. 60/343,973 filed Dec. 27, 2001.

TECHNICAL FIELD

The present invention relates generally to systems composed of multiple integrated circuit devices, and more particularly to systems with integrated circuit devices that can be distinguished from one another by a "chip" identification value.

BACKGROUND OF THE INVENTION

A typical electronic system may include multiple integrated circuit devices, often referred to as "chips." In some types of systems, there can be a need to distinguish one chip from another. Even more particularly, it may be desirable to assign a unique chip identification value (chip ID) to each chip in a system. Such an arrangement may be advantageous in testing devices in system, or in network applications, as will be described below. Chip IDs may be "hard-wired" or programmable. Hard-wired chip IDs can be established when a device is manufactured, and so may be set by a manufacturing process or step, and so may not be changed. Programmable chip IDs, as the name implies, may be programmed by a user or other system device or process.

Device identification values may be associated with a particular part of a system, as opposed to a single chip of a system. A well-known hardware identification value is a media access control (MAC) address. A MAC address can be a unique value associated with a particular network device, typically a network adapter. MAC addresses are also known as network hardware addresses or network "physical" addresses. A MAC address can uniquely identify a network device on a network, to thereby enable transfer of data from and to such a device. A MAC address is a 12 digit hexadecimal number having a predetermined format. Such a format may include a manufacturer identifier and a device serial number, and is dictated by predetermined standards.

While a MAC address serves network addressing well, such a value can be cumbersome for applications in systems having fewer components, and/or requiring command execution or more compact chip addressing as it can include 48 bits of data.

Another conventional approach for providing unique chip ID values to chips included in a system can be "pin" addressing. In pin addressing, distinct pins (e.g., conductive leads) of a chip can be tied to high or lower power supply voltages to establish either a "1" or "0" input. Such pins may thus establish a chip address.

A drawback to pin addressing can be increased pin count for a device, as a number of pins would be dedicated chip address pins. Further, pin addressing may complicate the layout of system boards (e.g., modules), or the like, as the number chips ultimately included in a board may not be know at the time a board is manufactured.

Conventional pin addressing schemes for a serial arrangement of chips are known. Such conventional approaches may issue a command, in packet form, that can assign an initial chip ID to a first device in a serial sequence. Each device in the serial sequence may assign a received chip ID value, increment such a value, and then forward the command to the next device in a sequence. In this way, unique chip ID values may be assigned in a system having a serial arrangement of chips.

One particular type of system that can include multiple chips is a search engine system. Search engine systems typically perform a search operation that can compare a search value (e.g., a comparand or key) against a number of other data values. In the event a search value matches a data value, a search result may be considered a "hit" (e.g., match). If a search value does not match any data values, a search result may be considered a "miss" (e.g., no match).

Search engines may take various forms. A search engine may be based on a general-purpose processor and accompanying algorithm that may access a number of memory devices. Such approaches may be undesirably costly when compared to smaller device-oriented approaches, such as a content addressable memory (CAM) based search engine systems.

A CAM based search engine system can typically include a number of CAM devices. A CAM device may include a number of entries, each of which may store a data value, or portion thereof. In a search operation, a comparand (or key) may be compared to multiple entries to see if all, or a portion, of the key matches an entry. After a search operation, a CAM device may give a search result as an output. Typically a search result may provide associated data directly, or provide an "index" value that may be used to retrieve associated data from another device, such as a random access memory.

CAM devices may take a variety of forms. As but a few of the possible examples, a CAM device may be based on particular types of CAM cells. Such cells may include storage circuits integrated with compare circuits. Examples of storage circuits may be static random access memory (SRAM) type cells or dynamic random access memory (DRAM) type cells. Alternate approaches may include random access memories (RAM) arrays, or the like, with separate matching circuits and/or processing circuits.

A CAM based system having multiple branches (e.g., processing paths) is disclosed in commonly owned, co-pending patent application Ser. No. 10/109,364, filed on Mar. 28, 2002, and titled CASCADABLE CONTENT ADDRESSABLE MEMORY (CAM) DEVICE AND ARCHITECTURE, by James et al., the contents of which are incorporated by reference herein. James et al. also discloses a vote circuit within a CAM device that can make a precedence determination from among multiple responses from CAM devices. Such a precedence determination may include comparing a chip field containing a unique value identifying a chip (e.g. a chip ID).

In light of the above, it would be desirable to arrive at some way of assigning unique chip ID values to chips in a system that has a more complex arrangement than a serial sequence.

It would also be desirable to arrive at some way of assigning unique chip ID values for CAM devices in a CAM based search engine system. Further, such an arrangement could be particularly desirable for CAM based search engine systems that may establish precedence or priority among results based on chip ID values.

SUMMARY OF INVENTION

According to the present invention, a method of acknowledging commands received by an integrated circuit device (chip) may include a special operation branching mode. In a special operation branching mode, a command for assigning a chip identification value (assign ID) may be forwarded with a first type acknowledgement via a first chip output connection. Further, in the special operation branching mode, an assign ID command may be forwarded via a second chip output connection with a second type acknowledgement that is different than the first type acknowledgement.

According to one aspect of the embodiments, the method may also include placing a chip in a special operation branching mode when the chip stores a predetermined cleared chip ID value, and such a chip receives an assign ID command directed to the cleared chip ID value.

According to another aspect of the embodiments, the method may further include switching from the special operation branching mode to a normal branching mode when the chip receives an assign ID command directed to the current chip ID value, where such an assign ID command is not acknowledged by another chip.

According to another aspect of the embodiments, a method may include, in a normal branching mode, a chip forwarding an assign ID command with a first type acknowledgement via first and second chip output connections when such an assign ID command is not acknowledged by another chip of the system.

According to another aspect of the embodiments, a method may include, in a normal branching mode, forwarding an assign ID command with no acknowledgement via the first and second chip output connections when such an assign ID command is not acknowledged by another chip of the system, and such an assign ID command is not directed to the current chip ID value of the chip.

According to another aspect of the embodiments, a method may include, in a through mode, forwarding an assign ID command with no additional acknowledgement when such an assign ID command is not directed to a current chip ID value of a chip. In addition, an assign ID command may be forwarded with a first type acknowledgement when an assign ID command is not acknowledged by another chip, and such an assign ID command is not directed to a current chip ID value of a chip.

According to another aspect of the embodiments, a method may further include, in a special operation joining mode, outputting a predetermined end of branch response to an assign ID command.

According to another aspect of the embodiments, a method may further include, placing a chip in a special operation joining mode when the chip stores a predetermined cleared chip ID value, and such a chip receives an assign ID command directed to a cleared chip ID value. Such an assign ID command may also include a first type acknowledgement.

According to another aspect of the embodiments, a method may further include, switching from a special operation joining mode to a normal joining mode in response to receiving an assign ID command, where such an assign ID command is not acknowledged by another chip of a system.

The present invention may also include a method for assigning chip identifiers in a multi-chip content addressable memory (CAM) system. Such a method may include assigning a highest order chip identifier to all CAM chips in a system, and broadcasting a lowest order chip identifier value to all CAM chips in the system. Such a lowest order CAM chip in a system can have a highest order chip identifier configured to accept the lowest order chip identifier as a new chip identifier. The method may further include repeating a broadcasting step for an incremental chip identifier value until each CAM chip in the system has a unique chip identifier value.

According to one aspect of the embodiments, the method may also include a chip identifier for all CAM chips comprises a multi-bit value, and a highest order chip identifier can include all such bits being a "1."

According to another aspect of the embodiments, a method may further include receiving at least one type of predetermined response prior to assigning a chip identifier for all chips of a first branch. A first branch may be one of a number of branches.

According to another aspect of the embodiments, a method may further include receiving a branch complete response that indicates a chip identifier of a branching CAM chip when chip identifiers are assigned to all chips of the first branch. A branching CAM chip may commonly connect a first and second branch.

According to another aspect of the embodiments, a method may further include reassigning a chip ID for a branching CAM chip in response to a branch complete response.

The present invention may further include a method of assigning chip ID values to a system that includes a plurality of CAM devices arranged into branches. Such a method can include returning a branch end response in response to an assign a chip identification (ID) command assigning a chip ID to a last chip of one of a plurality of branches.

According to one aspect of the embodiments, returning a branch end response can include returning a chip identification (chip ID) value of a branching CAM device. A branching CAM device can have a first output connection coupled to a first branch of CAM devices and a second output connection coupled to a second branch of CAM devices.

According to another aspect of the embodiments, a chip ID value of a branching CAM device can be returned when all CAM device of a first branch have been assigned unique chip ID values.

According to another aspect of the embodiments, a chip ID value of a branching CAM device can be returned in a predetermined field of a response packet.

According to another aspect of the embodiments, a method may further include acknowledging a received assign ID command differently down a first branch than a second branch while the CAM devices of a first branch are being assigned unique chip ID values.

According to another aspect of the embodiments, a method may further include acknowledging received chip ID assignment commands identically down a first branch and second branch when CAM devices of a first branch have been assigned unique chip ID values.

BRIEF DESCRIPTION OF THE DRAWINGS

FIG. 4 is a diagram showing a response format according to one embodiment of the present invention.

FIG. 5 is a block schematic diagram showing a response flow through a system according to one embodiment of the present invention.

FIG. 6 is a flow diagram showing a chip identification (ID) assigning method according to one embodiment of the present invention.

FIG. 7 is a diagram showing one example of a clear chip ID command CLEAR ID according to one embodiment of the present invention.

FIG. 8 is a diagram showing one example of an assign chip ID command ASSIGN ID according to one embodiment of the present invention.

FIGS. 9A-0 to 9J-1 are a series of block schematic diagrams showing a chip ID assigning method according to an embodiment of the present invention.

DETAILED DESCRIPTION OF THE EMBODIMENTS

Various embodiments of the present invention will now be discussed in conjunction with a number of figures. The embodiments set forth methods for assigning unique identification values (chip IDs) to devices in a system that may include one or more branches. The embodiments also show particular approaches to assigning chip ID values to CAM devices of a search engine system.

Figure 1:
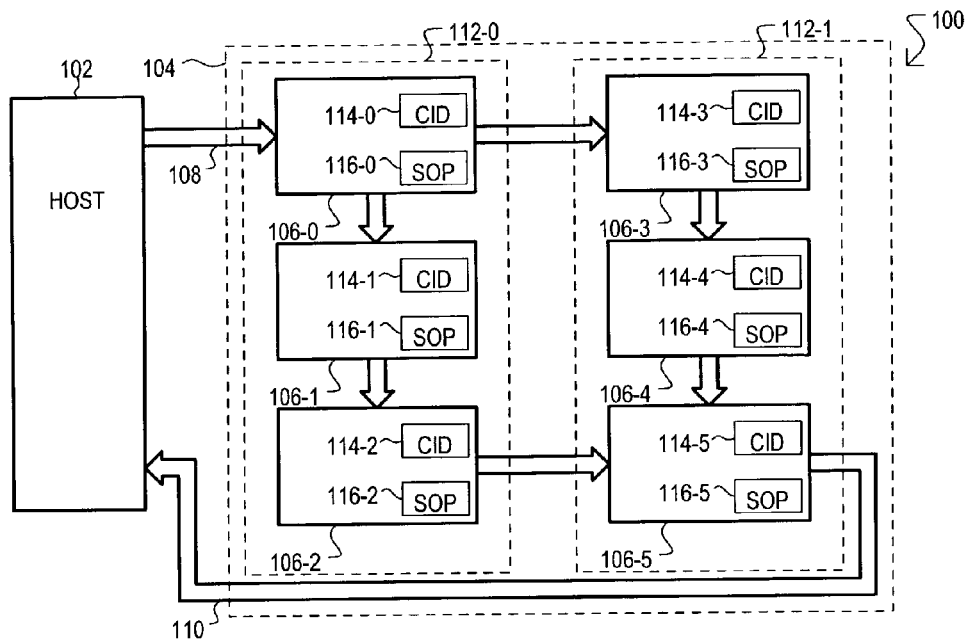
FIG. 1 is a block schematic diagram of a system having multiple branches according to one embodiment of the present invention.

Referring now to FIG. 1, a system having multiple devices and branches is set forth in a block diagram and designated by the general reference character 100. A system 100 may include a command issuing portion (e.g., a host) 102 and a command processing portion 104. A host 102 may include a processor, or the like. Preferably, a host 102 can include a network processing unit (NPU) that may issue various search engine related commands.

In one approach, commands issued by a host 102 may include an assign chip ID command and a clear chip ID command. Particular examples and formats of such commands will be described below.

A command processing portion 104 may include a number of devices (chips) 106-0 to 106-5 arranged to receive commands from a host 102, and provide responses to such commands to a host 102. A command processing portion 104 can be connected to a host 102 by one-way connections. In particular, a command processing portion 104 may receive input data via a system input connection 108 and provide output data via a system output connection 110. Input data may include commands, while output data may include acknowledged commands and/or responses to commands.

A command processing portion 104 may include a number of branches 112-0 and 112-1. A branch (112-0 and 112-1) may include a number of chips (106-0 to 106-5) arranged in series. Further, while branches may be arranged in series, two or more branches may be arranged in parallel (112-0 and 112-1). Such a case is shown in FIG. 1, with branch 112-0 in parallel with branch 112-1. More particularly, branch 112-0 may include a "branching" chip 106-0 that may forward a command down at least two different branches, while branch 112-1 may include a "joining" chip 106-5 that may merge commands and/or responses from two different branches.

In one arrangement, a branch (112-0 and 112-1) may be a module that includes a circuit board on which chips are interconnected. A system 100 may thus be expandable by adding modules to form additional parallel or serial branches.

FIG. 1 illustrates how chips (106-0 to 106-5) within a system may have various configurations. As was noted above, chip 106-0 can be considered a branching chip, and chip 106-5 may be considered a joining chip. Remaining chips 106-1 to 106-4 may be "through" chips, which may receive commands, forward such commands, and/or output responses to such commands.

Each chip (106-0 to 106-5) may include at least one input connection and at least one output connection. For example, a branching chip 106-0 may include an input connection connected to a system input connection 108, and two output connections. A first output connection, which may be conceptualized as a "near" output connection, may be connected to through chip 106-1. A second output connection, which may be conceptualized as a "far" output connection, may be connected to through chip 106-3. Through chips 106-1 to 106-4 may each have one input connection and one output connection. Finally, a joining chip 106-5 may include a first input connection that may receive commands and responses from through chip 106-2 and a second input connection that may receive commands and responses from through chip 106-4. Joining chip 106-5 may include an output connection that can provide a final command and response output for a command processing portion 104.

Preferably, all chips (106-0 to 106-5) may have the same structure, each including at least two input connections and at least two output connections, with branching chips (e.g., 106-0) utilizing only one input connection, through chips (e.g., 106-1 to 106-4) utilizing only one input and one output connection, and joining chips (e.g., 106-5) utilizing only one output connection.

Each chip (106-0 to 106-5) may be capable of storing a number of values, including a chip ID value in a chip ID store (114-0 to 114-5) and a special operation (SOP) value in a SOP store (116-0 to 116-5). A chip ID value can a multi-bit value that may enable unique identification of multiple chips in a system, yet may be relatively small with respect to conventional identifiers (such as a MAC address) and hence may not contribute significantly to command size. In one approach, a chip ID value may be no more than 16 bits, preferably no more than 12-bits, even more preferably eight bits.

A SOP value can establish a special operating mode for a chip. Examples of special operation modes will be described in more detail below. A SOP value can preferably be switched between at least two values to establish a special operating mode or a normal operating mode.

A chip (106-0 to 106-5) may also provide certain responses to received commands. In particular, a chip (106-0 to 106-5) can receive commands issued by a host 102, acknowledge such commands, and/or generate responses to commands. These features will be described in various examples below.

Still further, while chips (106-0 to 106-5) may perform various functions, chips (106-0 to 106-5) may preferably be memory devices, such as random access memories, even more preferably content addressable memory (CAM) devices.

Figure 2:
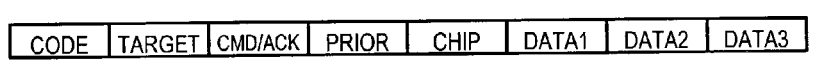
FIG. 2 is a diagram showing a command format according to one embodiment of the present invention.

One example of a command format is shown in FIG. 2. A command may be transmitted with predetermined data fields. In the particular example of FIG. 2, a command may include a CODE field that can designate the start of a command data packet, a target field TARGET that may indicate a target for which the command is intended (e.g., multiple chips, portions of single chips, etc.), a command/acknowledge field CMD/ACK that may include a command field CMD that can indicate a type of command (e.g., assign ID or clear ID), and an acknowledge ACK field that may include an acknowledgement value. A chip ID field CHIP can indicate a particular chip ID for which a command is intended. The command of FIG. 2 also shows various data fields as DATA1 to DATA3.

An acknowledge field ACK may change as a command flows through multiple chips. Such an operation will now be described with reference to FIG. 3.

Figure 3:
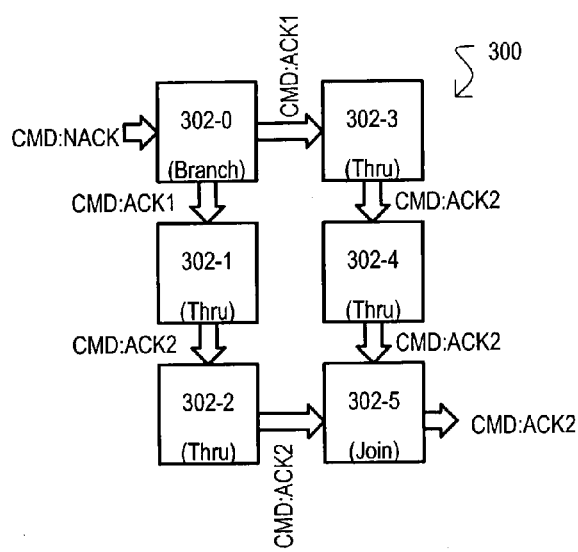
FIG. 3 is a block schematic diagram showing a command flow through a system according to one embodiment of the present invention.

FIG. 3 is a block diagram of a command processing portion like that shown as 104 in FIG. 1. In FIG. 3, a command processing portion 300 may include a number of chips (302-0 to 302-5) interconnected in the same general fashion as FIG. 1. Thus, a command may be received at an input connection of a branching chip 302-0 and propagate to all chips (302-0 to 302-5) in a command processing portion 300.

In the example of FIG. 3, it is assumed that a command is intended for all chips (302-0 to 302-5). As but one example, it can be assumed that all chips (302-0 to 302-5) have been initialized or "cleared" to a same starting chip ID value. Further, a command like that shown in FIG. 2 may include a chip ID field value CHIP that matches a starting chip ID value of all chips (302-0 to 302-5). Accordingly, all chips (302-0 to 302-5) can acknowledge the command.

Referring still to FIG. 3, a host or the like, can initially issue a command. Because such a command has not been received by any chip in a command processing portion 300, the command may be unacknowledged, and so is shown as CMD:NACK (the "NACK" indicating no acknowledgement). If reference is made back to FIG. 2, a command may be designated as unacknowledged by acknowledge field ACK storing a predetermined value (e.g., "0" representing NACK).

An unacknowledged command CMD:NACK may be received by a branching chip 302-0. Because it is assumed that the command CMD:NACK is directed to all chips, branching chip 302-0 may acknowledge the command before forwarding the command to chips 302-1 and 302-3. Thus, a command forwarded via both output connections of branching chip 302-0 may have a single acknowledgement, and so are shown as CMD:ACK1. If reference is made back to FIG. 2, a command may be designated with a single acknowledgement by acknowledge field ACK storing a predetermined value (e.g., "1").

A single acknowledged command CMD:ACK1 may be received by through chip 302-1. Again, because the command is targeted to all chips, through chip 302-1 may further acknowledge the command before forwarding the command to chip 302-2. However, acknowledgements may include both single and summary acknowledgements. Thus, a command forwarded by through chip 302-1 may have a summary acknowledgement, and so is shown as CMD:ACK2. If reference is made back to FIG. 2, a command may be designated with a summary acknowledgement by acknowledge field ACK storing a predetermined value (e.g., "2").

Through chip 302-3 may operate in the same general fashion as chip 302-1, and forward a command with a summary acknowledgement CMD:ACK2.

Through chips 302-2 and 302-4 may receive summary acknowledged commands CMD:ACK2. However, while it is assumed that such commands are targeted to chips 302-2 and 302-4, because the command is already summary acknowledged, any additional acknowledgement may maintain the summary acknowledgement. Thus, commands forwarded by through chips 302-2 and 302-4 may be summary acknowledged commands CMD:ACK2.

Joining chip 302-5 may receive two summary acknowledge commands. Because such commands are already summary acknowledged, joining chip 302-5 may output a summary acknowledge command CMD:ACK2.

In this way, commands may be acknowledged by chips of a system, and include summary acknowledgements that can indicate when more than one chip has acknowledged a command.

As noted above, in addition to acknowledging a command, according to the present invention a chip may generate a response to a command.

One example of a response format is shown in FIG. 4. A response, like a command, may be transmitted with predetermined data fields. In the particular example of FIG. 4, a response may include a CODE field that can designate a start of a command data packet, a response field that may distinguish a response from a command, a status field STAT that may indicate a response type, a priority field PRIORITY that may establish a priority from among multiple responses (e.g., responses from different chips to a same command), and a chip ID field CHIP that may indicate a chip generating a response. A status field STAT may include both single type responses and summary responses. The response of FIG. 4 also shows various data fields as DATA1 to DATA3.

Summary response status fields are described in more detail in commonly-owned co-pending patent application filed on Dec. 23, 2002, and titled PACKET BASED COMMUNICATION FOR CONTENT ADDRESSABLE MEMORY (CAM) DEVICES AND SYSTEMS, by James et al., the contents of which are incorporated by reference herein.

Like an acknowledge field described above, a status field may change as responses to a given command flow through multiple chips of a system. Such an operation will now be described with reference to FIG. 5.

FIG. 5 is a block diagram of a command processing portion like that shown in FIG. 3. In the example of FIG. 5, it is assumed that a command has been issued (CMD), and that all chips are generating a same type response to such a command.

After a command has been received by a chip (502-0 to 502-5), chips may begin outputting responses. A branching chip 502-0 may generate a single event response M1 that may be received by through chips 502-1 and 502-3. If reference is made back to FIG. 4, such a single response may be designated by a status field STAT storing one predetermined value (e.g., 0 (hex)).

A single event response may be received by through chips 502-1 and 502-3. Such through chips (502-1 and 502-3), internally generate similar single event responses. However, such internal single event responses can be added to received single event responses to generate summary responses M2 as outputs. If reference is made back to FIG. 4, a response can be designated as a summary response by a status field STAT storing a predetermined value (e.g., "8" (hex)).

Each of through chips 502-2 and 502-4 may receive summary responses M2, and generate an internal single event response. Such internal single event responses, when added to received summary event responses, can result in a same summary response. Accordingly, through chips 502-2 and 502-4 can output summary responses M2 to joining chip 502-5.

Joining chip 502-5, like the other chips 502-0 to 502-4 may generate an internal single event response. Adding such an internal response to received summary responses can result in joining chip 502-5 outputting a summary result M2.

Having described general command-response generation for a system, a method for assigning chip IDs in such a system will now be described.

Referring now to FIG. 6, a method is set forth in a block diagram and designated by the general reference character 600. A method 600 may be executed by a command requesting device, such as a host, or the like.

A method 600 may include setting all chips in a system to a predetermined value. In the particular example of FIG. 6, this may include setting all chips to a value "FF" (step 602). A value FF may be a hexadecimal representation of a highest order eight bit binary value. In one approach, a highest order value can be a maximum possible value.

A method 600 may further include setting a New ID value to "0" (step 604). A New ID value may be a value supplied by a host, or the like. As will be described in more detail below, a chip may set its Chip ID value to a New ID value provided by a host according to a particular command.

A method 600 may also broadcast the New ID value to all chips (step 606). In one very particular approach, a step 606 may include issuing a command that may flow through all chips of a system, as illustrated in FIG. 3. In response to a step 606, a chip may assign the New ID value as its own Chip ID value. Various example of such an operation will be shown below.

After broadcasting a New ID value, a method may monitor a returned response to see of an end-of-branch has been reached (step 608). An end-of-branch can be reached when a last chip in a branch has assigned a New ID value. An end-of-branch response may be an actual response issued from a chip, or may also include the manner by which a command has been acknowledged.

If an end of branch has not been reached, a New ID value may be incremented (step 610). Steps 606 and 608 may be repeated until an end-of-branch is reached.

Once an end of branch is reached, a returned response may be monitored to see if such a branch was a last branch (step 612). If the branch is not a last branch, steps 606 and 608 may be repeated until another end-of-branch is reached.

Once a last branch has been completed, a Chip ID assignment process may conclude (step 614).

Having described one example of a chip ID assigning method, particular commands that may be executed by chips in chip ID assigning operations will now be described in detail.

Referring now to FIG. 7, one example of a CLEAR ID command is set forth in a block diagram. A CLEAR ID command may be used to set a chip ID value of a chip to a predetermined value: in this case FF. The CLEAR ID command will be referred to at various locations herein by the abbreviation CID. The command illustrated includes various fields. A "- - -" symbol in a field indicates that such a value is a "don't care" value with respect to the execution of the command.

Referring to FIG. 7, "Old State" fields shows chip properties prior to a CLEAR ID command. Such properties include a mode of operation MODE, the state of a special operation bit SOP, a chip's current chip ID value ChipID. Modes of operation MODE may include "BRANCH" for a chip having a branching configuration, "THRU" for a chip having a through configuration, and "JOIN" for a chip having a join configuration. Examples of branching, through, and joining configuration were described with reference to FIG. 3.

"Command" fields show how a CLEAR ID command may be received by a chip. Command fields include "Chip" which may indicate which chip(s) a command is intended for, "CMD Stat0" and "CMD Stat1" which may indicate an acknowledge state of a received command. Branching and through chips receive only one command, thus could only receive a CMD Stat0 value. Joining chips may receive two commands, thus one command could include the CMD Stat0 value, while the other could include the CMD Stat1 value.

"New State" fields show the properties of a chip following a received CLEAR ID command. Such properties include SOP and ChipID values already described.

"Response" fields show status values that may be included in a response output from a chip generated in response a CLEAR ID command. Response fields include "Stat0" and "Stat1." Joining and through chips can output responses down single communication links, and thus can only provide one response with a Stat0 value. Branching chips may output responses down two communication links. Thus, a response output down one communication link could include a Stat0 value, while a response output down another communication link could include a Stat1 value.

As shown by FIG. 7, regardless of mode, a CLEAR ID command results in a chip having a "cleared" state in which a special operation bit SOP has one value "0" and a chip ID is set to value FF.

In one very particular arrangement, a CLEAR ID command may take the form of a packet like that shown in FIG. 2. In such a case, a TARGET field may be a "global" value that indicates the CLEAR ID command is intended for all chips. Such a global value may take precedence over a value in a chip ID field CHIP.

A command field CMD/ACK may be a predetermined value that indicates a CLEAR ID command. An acknowledge portion of command field may initially be unacknowledged (NACK). However, as illustrated by FIG. 3, as a CLEAR ID flows through a first chip, such a field can be changed to a single acknowledgement ACK1. After flowing through any subsequent chips, such an acknowledgement can be changed to a summary acknowledge ACK2. As seen by the "—-" symbol in the "CMD Stat0" and "CMD Stat1" fields, a CLEAR ID value can be executed regardless of what type of acknowledgement is included in the command.

Similarly, a response to a CLEAR ID command may take the form of a response packet like that shown in FIG. 4. In such a case, a status field STAT may be a "zero" status result M0. Such a status value will not add to a status value of a received response. Thus, status values of all responses from a CLEAR ID command can have an M0 value.

If reference is made back to FIG. 6, a CLEAR ID command may be used in a step 602.

Referring now to FIG. 8, one example of an ASSIGN ID command is set forth in a block diagram. An ASSIGN ID command may be used to assign a New ID value as a Chip ID value for a targeted chip. The ASSIGN ID command will be referred to at various locations herein by the abbreviation AID. The command illustrated includes the same fields described in conjunction with FIG. 7.

In one very particular arrangement, an ASSIGN ID command may take the form of a packet like that shown in FIG. 2. A command field CMD/ACK may be a predetermined value that indicates an ASSIGN ID command. An acknowledgement ACK may initially be unacknowledged (NACK). However, as illustrated by FIG. 3, as an ASSIGN ID flows through other chips, such a field may change. Further, as shown by FIG. 8, changes in such a value can affect how a chip processes an ASSIGN ID command.

Referring again to FIG. 2, a chip ID field CHIP may direct an ASSIGN ID to a particular chip or chips. A data field DATA3 may include a New ID value.

Further, a response to an ASSIGN ID command may take the form of a response packet like that shown in FIG. 4. As shown by the Response fields of FIG. 8, status values Stat0 and Stat1 may vary according to the particular parameters of a received ASSIGN ID command.

If reference is made back to FIG. 6, an ASSIGN ID command may be used in a step 606.

Having described particular commands, a method for assigning chip IDs to chips of a system will now be described that may utilize such commands.

Referring now to FIGS. 9A-0 to 9J-1, a system for processing commands having multiple branches is set forth in a block diagram and designated by the general reference character 900. A system 900 may include a number of chips 902-0 to 902-5 connected in the same general fashion as FIGS. 3 and 5. Figure pairs (9A-0/9A-1, 9B-0/9B-1, etc.) show the application of a command and corresponding response to such a command.

It is noted that in the embodiment of FIGS. 9A-0 to 9J-1, a branching chip may have a special operating mode. Such a mode may be established by a special operation bit being set (to "1" in this example). In a special operating mode, a branching chip may acknowledge a received command differently down one communication link than another. In particular, in FIGS. 9A-0 to 9J-1, when a branching chip is in a special operation mode, commands down a "near" branch will not be acknowledged while commands down a "far" branch will be given a double, or summary acknowledge (e.g., ACK2). Further, a far branch response may carry a chip ID value or such a branching chip.

Similarly, a joining chip may also have a special operating mode. Such a mode may be established by a special operation bit being set (to "1" in this example). In the special operating mode, a joining chip may respond to a received command with a special type response and/or acknowledgement. Such a special response and/or acknowledgement can indicate when an end of a branch has been reached in a chip ID assignment process.

Figures 0, 9B:
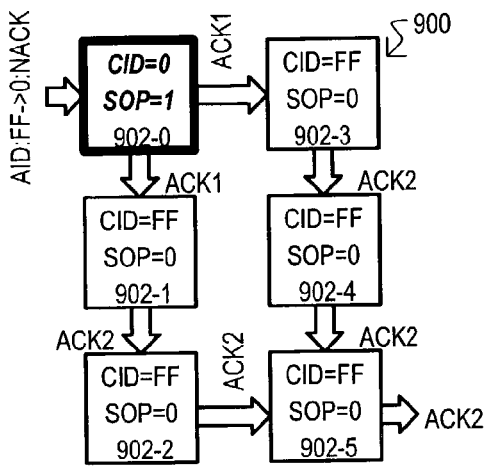
Figures 1, 9B:
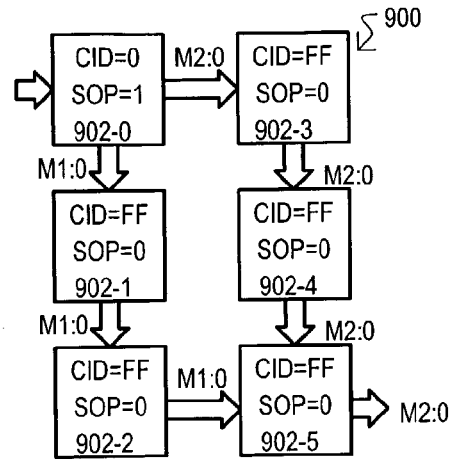

Referring now to FIGS. 9A-0 and 9A-1, a chip assignment method may begin by initializing or "clearing" all chip ID for chips of a system. In FIGS. 9A-0, a CLEAR ID command (CID) can be issued. Such a command may be received at a branching chip 902-O and may be unacknowledged (NACK). A CID command may then flow through the various other chips of the system. As will be recalled from FIG. 7, in response to a CID command, a chip may have its chip ID set to FF and its special operation bit (SOP) set to 0. Consequently, in response to such a command all chips 902-0 to 902-5 may have chip IDs cleared to FF and SOP bits set to 0.

While FIGS. 9A-0 shows chips acknowledging the CID command, alternate approaches could include chips that are designed to not acknowledge such a command.

As also shown in FIG. 7, a response to a CID command may be a "non-response" represented by M0. An M0 response does not add to a summary response value. Thus, all chips, including joining chip 902-5 may issue M0 type responses in FIG. 9A-1.

Referring now to FIGS. 9B-0 and 9B-1, a chip assignment method may continue by broadcasting sequentially higher chip ID values until a branch end is reached. FIGS. 9B-0 shows the issuance of an ASSIGN ID command (AID) which directs a chip with chip ID FF to change its chip ID to 0 (FF ->0). Such a command may be received at a branching chip 902-0 and may be unacknowledged (NACK). As shown by FIG. 8, in response to such an unacknowledged ASSIGN ID command, branching chip 902-0 may change its current chip ID (FF) to the supplied new ID (0). Further, the SOP bit in branching chip 902-0 may be set to 1 (SOP=1), thereby placing the branching chip in a special operating mode. Further, branching chip 902-0 may singly acknowledge (ACK1) the AID command, and then forward the AID command down a near output connection to chip 902-1 and down a far output connection to chip 902-3.

Remaining chips (902-1 to 902-4) may also singly acknowledge the received command. Such a single acknowledgement from chips 902-1 and 902-3 may be added to a received single acknowledgement. Thus, chips 902-1 and 902-3 may output a summary acknowledgement ACK2. While chips 902-2, 902-4 and 902-5 may add their own single acknowledgements, because such chips already receive a summary acknowledgement, a summary acknowledgement may be output.

It is noted that because remaining through chips (902-1 to 902-4) receive an acknowledged AID command, chip ID values for such chips remain the same (FF). Similarly, because joining chip 902-5 receives a double acknowledged command, a state of joining chip 902-5 may remain unchanged.

As a result, a system may output a summary acknowledgement result ACK2. Such a result may be returned to a command issuing device (e.g., host), and indicate that a chip assignment operation is not yet complete.

Referring to FIGS. 9B-1, in response to the AID command, a joining chip 902-0 may generate a response down near and far paths as shown by FIG. 8. Because the chip that has responded to the command has a chip ID of 0, such a value may be carried by a response (show as 0 following the colon).

Figures 0, 9C:
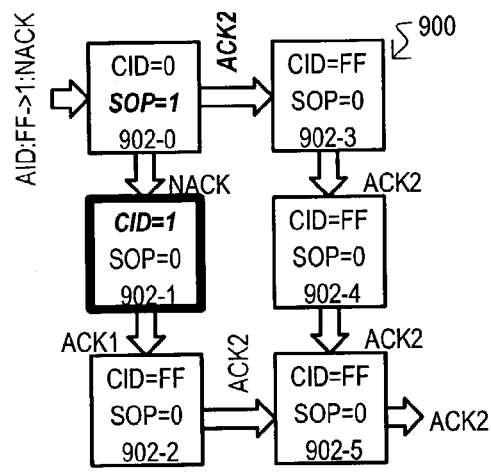
Figures 1, 9C:
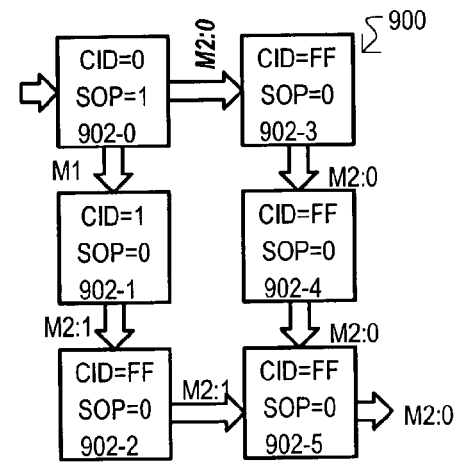

Referring now to FIGS. 9C-0 and 9C-1, a chip assignment method may continue by broadcasting a sequentially higher chip ID. FIGS. 9C-0 shows the issuance of an ASSIGN ID command (AID) that directs a chip with chip ID "FF" to change its chip ID to 1 (FF->1). Such a command may be received at a branching chip 902-0. In a normal operation mode, such an AID command would not be acknowledged down both near and far branches because the command is directed to chip FF and branching chip 902-0 has a chip ID "0." However, because branching chip 902-0 has been set to a special operation mode (SOP=1), branching chip may double acknowledge the command down a far communication link. Consequently, through chip 902-1 may received an unacknowledged AID command (NACK), while through chip 902-3 may receive a summary acknowledged command (ACK2).

As shown by FIG. 8, in response to an unacknowledged AID command, through chip 902-1 may change its current chip ID (FF) to the supplied new ID (1). However, through chip 902-3 may retain its same chip ID, as it receives a summary acknowledged command.

As also shown in FIGS. 9C-0, a system may output a summary acknowledgement result ACK2. Again, such a result may be returned to a command issuing device (e.g., host), and indicate that a chip assignment operation is not yet complete.

Referring to FIGS. 9C-1, in response to the AID command, a joining chip 902-0 may generate a special operation summary response that carries its own chip ID (0) down a far communication link. Such a response is represented by the character M2:0. Chip 902-1, which responds to the command, may provide its own chip ID (1) in a response (M1:1). However, within a joining chip 902-5, a lower chip ID may take precedence over a higher chip ID. Consequently, a final response output by joining chip 902-5 may carry the chip ID of branching chip (M2:0).

Figures 0, 9D:
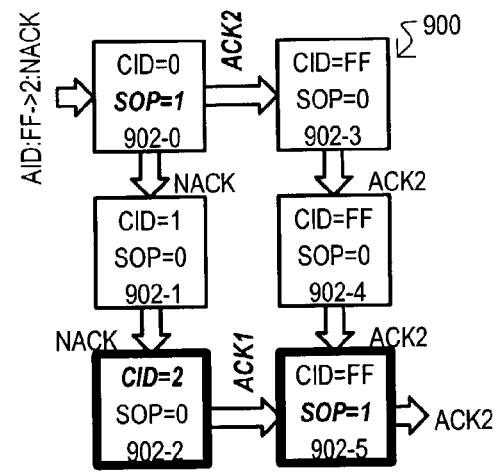
Figures 1, 9D:
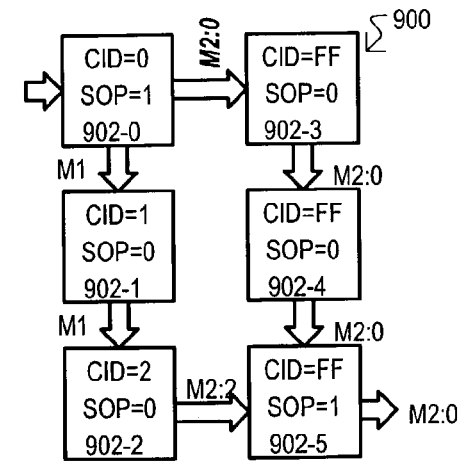
Figures 0, 9E:
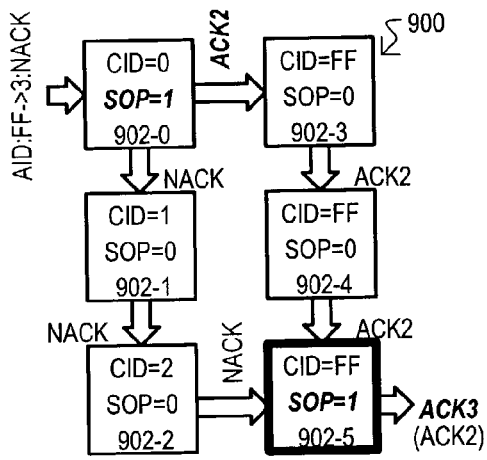
Figures 1, 9E:
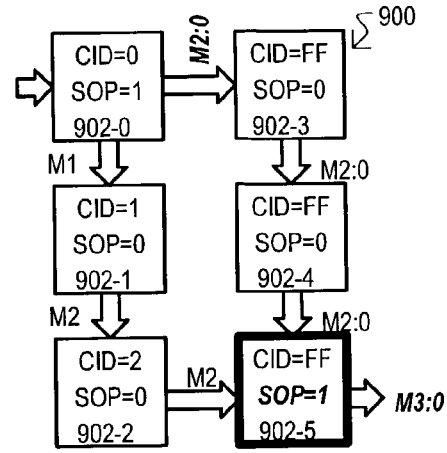

Referring now to FIGS. 9D-0 and 9D-1, a chip assignment method may continue by again broadcasting a sequentially higher chip ID. FIGS. 9D-0 shows the issuance of an ASSIGN ID command (AID) that directs a chip with chip ID "FF" to change its chip ID to 2 (FF->2). Such a command may be received at a branching chip 902-0, which may respond in the same special operation fashion, as shown in FIGS. 9E-0.

Through chip 902-1 may not acknowledge the command, as its chip ID (1) does not match that of the AID command (FF).

However, in response to an unacknowledged AID command, through chip 902-2 may change its current chip ID (FF) to the supplied new ID (2). Further, through chip 902-2 may provide a single acknowledgement for the command (ACK1).

As shown by FIG. 8, in response to receiving a single acknowledged command, joining chip may be placed in a special operation mode (SOP=1).

As shown in FIGS. 9D-0, a system may output a summary acknowledgement result ACK2. Again, such a result may be returned to a command issuing device (e.g., host), and indicate that a chip assignment operation is not yet complete.

Referring now to FIGS. 9E-0 and 9E-1, a chip assignment method may continue by again broadcasting a sequentially higher chip ID. FIGS. 9E-0 shows the issuance of an AID command that directs a chip with chip ID "FF" to change its chip ID to 3 (FF->3). Such a command may be received at a branching chip 902-0, which may respond in the same special operation fashion, as shown in FIGS. 9C-0.

Such an AID command may flow through chips 902-1 and 902-2 unacknowledged, and through chips 902-3 and 902-4 double acknowledged. The AID command may then be received by joining chip 902-5.

Because joining chip 902-5 is in the special operation mode, joining chip may specially acknowledge the command, shown as ACK3. Such a special acknowledgement may be returned to a command issuing device (e.g., host), and can indicate that an end of branch has been reached.

Referring to FIGS. 9D-1, and as shown in FIG. 8, in a special operation mode, in response to a command, a branching chip may issue a special response M3. Such a special response may carry the chip ID value (O). Such a response may also indicate that an end of branch has been reached.

It is noted that alternatively, in a special operation mode, a joining chip may not provide any special acknowledgement. This is shown by the ACK2 in parentheses. In such a case, only a special response M3 may indicate an end of branch.

In response to receiving an end of branch indication, a chip ID assigning method may begin assigning chip IDs for a next branch. In the example of FIGS. 9A-0 to 9J-1, in order to begin assigning chip ID values for next branch, a branching chip may first be switched from a special operation mode to a normal operation mode. Such a step may involve comparing a chip ID value in a response to the last new ID value issued in an assign ID command.

In the very particular example of FIGS. 9A-0 to 9H-1, if a returned chip ID value of a special acknowledgement is less than the last "new ID" issued, a last branch has not been reached. In the present example, a returned chip ID=0, and the last new ID=3, thus a last branch has not been reached.

If a last branch has not been reached, a command issuing device may change the operating mode of a branching chip to thereby allow assignment of ID values down a new branch. This can include re-assigning a chip ID value returned by the special response in order to change such a chip from a special operating mode to a normal (e.g., not special) operating mode. Such an operation is shown in FIGS. 9F-0 and 9F-1.

Figures 0, 9F:
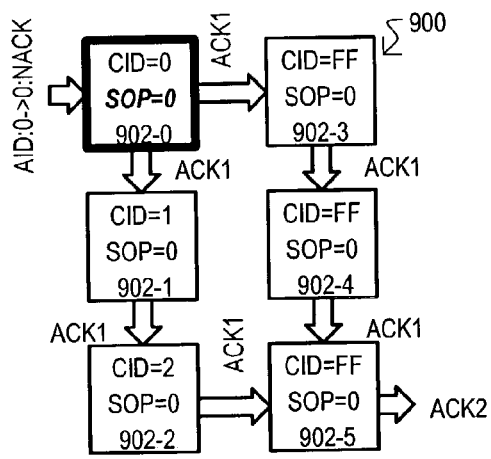
Figures 1, 9F:
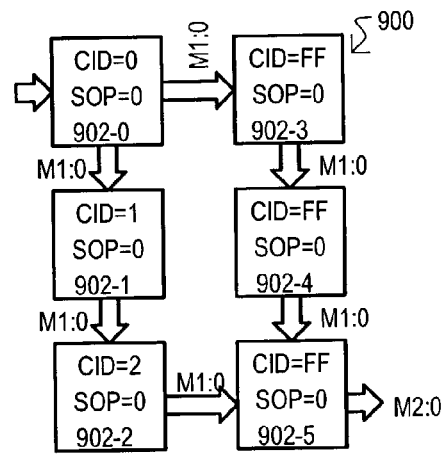

Referring now to FIGS. 9F-0 and 9F-1, a chip assignment method may continue by re-assigning a chip ID value for chip ID 0. FIGS. 9F-0 shows the issuance of an AID command that directs a chip with chip ID "0" to change its chip ID to 0 (0->0). As shown by FIG. 8, in response to such a command, a branching chip 902-0 may clear its special operation bit (SOP=0). This may place the branching chip into a normal mode of operation.

The AID command may flow through chips 902-1 and 902-2 unacknowledged, as such a command is directed to chip ID 0.

As shown in FIGS. 9F-1, a response may be a summary response that carries a chip ID of 0 (M2:0)

Having changed the mode of a branching chip 902-0, a method may return to assigning chip ID values, beginning with the last new ID value (in this case 3).

Figures 0, 9G:
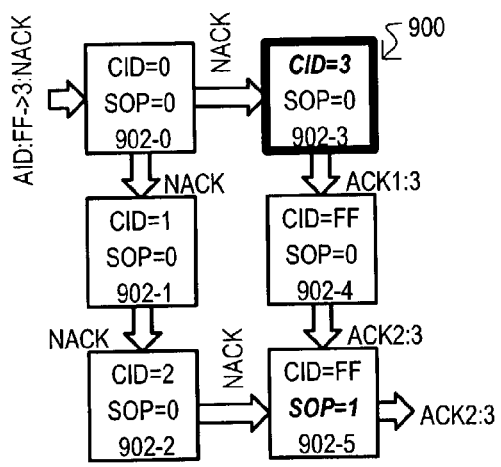
Figures 1, 9G:
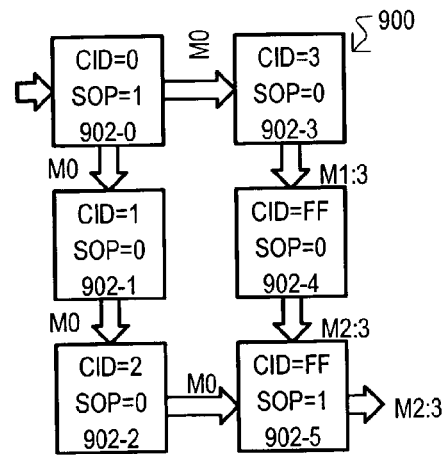

Referring now to FIGS. 9G-0 and 9G-1, a chip assignment method may continue by again broadcasting a previous chip ID value that resulted in the generation of a special response and/or special acknowledgement. Accordingly, an AID command can be issued that directs a chip with chip ID "FF" to change its chip ID to 3 (FF->3). Because branching chip 902-0 is not operating in a special operation mode, such a command may be forwarded, unacknowledged, to through chip 902-3.

Through chip 902-3 may change its chip ID to the new chip ID. Acknowledgements by chips 902-3 to 902-5 may result in a summary acknowledgement ACK2. Such an acknowledgement may indicate chip assignment operations should continue.

Responses may be generated as indicated by FIG. 8. Further, because chip 902-3 has responded to the ASSIGN ID command, a resulting summary response may carry chip ID 3 (M2:3).

Figures 0, 9H:
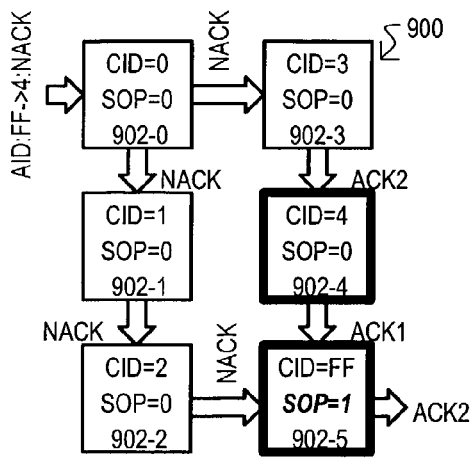
Figures 1, 9H:
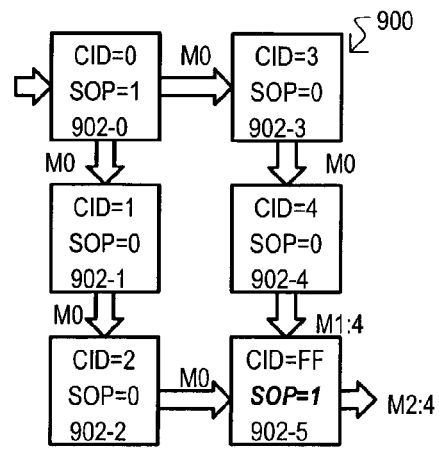

Referring now to FIGS. 9H-0 and 9H-1, a chip assignment method may continue by broadcasting a next chip ID value in a sequence.

Through chip 902-4 may change its chip ID to the new chip ID. A single acknowledgement ACK1 by chip 902-4 may result in joining chip 902-5 being placed in the special operating mode (SOP=1).

A summary acknowledgement ACK2 may be output, indicating chip assignment should continue.

Responses may be generated as indicated by FIG. 8, to result in an output of a summary response carrying chip ID 4 (M2:4).

Figures 0, 9I:
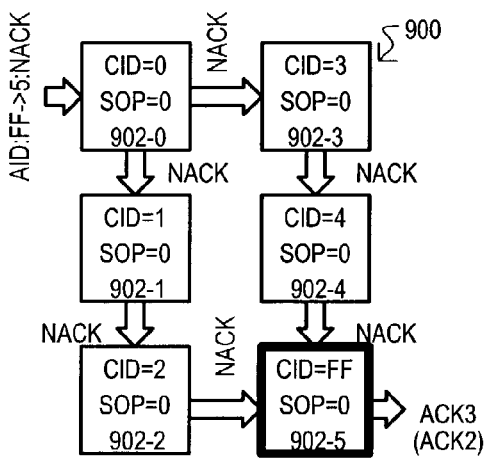
Figures 1, 9I:
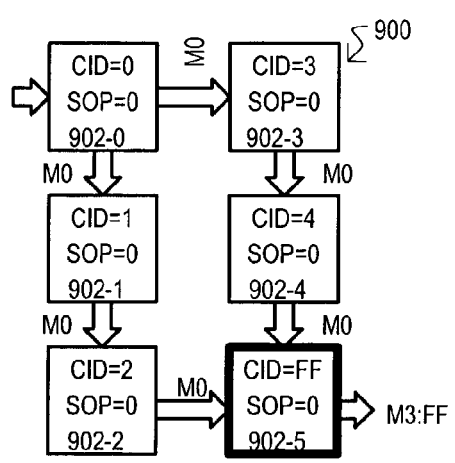

Referring now to FIGS. 9I-0 and 9I-1, a chip assignment method may continue by again broadcasting a sequentially higher chip ID. FIG. 9I-0 shows the issuance of an AID command that directs a chip with chip ID "FF" to change its chip ID to 5 (FF->5).

Because joining chip 902-5 is in the special operation mode, joining chip may specially acknowledge the command, shown as ACK3. Such a special acknowledgement may be returned to a command issuing device (e.g., host), and can indicate that an end of branch has been reached.

Further, as shown in FIG. 9I-1, in a special operation mode, a branching chip may issue a special response M3.

Such a special response may carry the chip ID value (FF), chip 902-5 is the only chip responding to the command, and its chip ID is FF.

Still further, within joining chip 902-5, a special operation bit may return to a previous value (SOP=0). Thus, "SOP=0" is shown in FIGS. 9I-0 and 9I-1 for joining chip 902-5.

As noted previously, a special response (M3) and/or acknowledgment (ACK3) can indicate an end of branch has been reached. Further, if a returned chip ID value of a special acknowledgement is less than the last "new ID" issued, a last branch has not been reached. In the present example, a returned chip ID=FF, and the last new ID=5, thus a last branch has been reached.

If a last branch has been reached, a command issuing device may repeat a previous assigning command, to thereby assign a chip ID to a last device in a system. Such an operation is shown in FIGS. 9J-0 and 9J-1.

Figures 0, 9J:
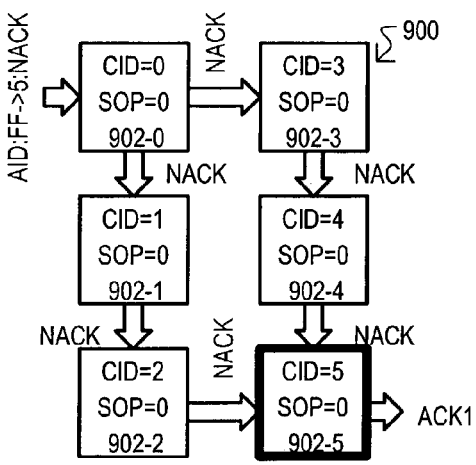
Figures 1, 9J:
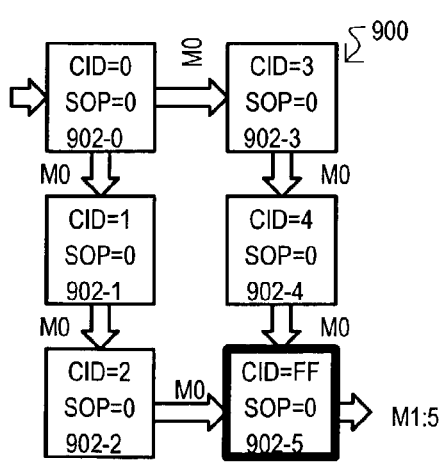

Referring now to FIGS. 9J-0 and 9J-1, a chip assignment method may repeat a previous assigning command assigning a new ID value of 5 to a chip having a chip ID of FF. Such a command may be received, unacknowledged, by joining chip 902-5. As shown by FIG. 8, in response to such an unacknowledged command, a joining chip 902-5 may change its chip ID (FF) to the new ID (5). Further, such an AID command may be acknowledged with a single acknowledgement ACK1.

A single acknowledgment ACK1 can indicate that a last chip has been assigned a chip ID value. Thus, a chip ID assigning operation can end.

As shown by FIGS. 9J-1, a joining chip 902-5 may issue a single response M1 that carries its new chip ID (M1:5).

Of course, the particular command and response arrangement shown by FIGS. 9A-0 TO 9J-1, represent by one embodiment.

Thus, while the embodiments set forth herein have been described in detail, it should be understood that the present invention could be subject to various changes, substitutions, and alterations without departing from the spirit and scope of the invention. Accordingly, the present invention is intended to be limited only as defined by the appended claims.

What is claimed is:

1. A method of acknowledging commands received by an integrated circuit device chip, comprising the steps of:
   in a special operation branching mode:
   forwarding an assign ID command for assigning a chip identification value with a first type acknowledgement via a first chip output connection, and
   forwarding the assign ID command with a second type acknowledgement via a second chip output connection.

2. The method of claim 1, further including:
   placing the chip in the special operation branching mode when the chip stores a predetermined cleared chip ID value and receives the assign ID command directed to the cleared chip ID value.

3. The method of claim 1, further including:
   switching from the special operation branching mode to a normal branching mode when the chip receives the assign m command directed to a current chip ID value, and the assign ID command is net acknowledged by another chip.

4. The method of claim 3, wherein:
   in the normal branching mode, forwarding the assign ID command with the first type acknowledgement via the first and second chip output connections when the assign ID command is not acknowledged by another chip.

5. The method of claim 3, wherein:
   in the normal branching mode, forwarding the assign ID command with no acknowledgement via the first and second chip output connections when the assign ID command is not acknowledged by another chip of the system and is not directed to the current chip m value of the chip.

6. The method of claim 1, further including:
   in a through mode:
   forwarding the assign ID command with no additional acknowledgement when the assign D command is not directed to the current chip m value of the chip, and
   forwarding the assign ID command with a first type acknowledgement when the assign m command is not acknowledged by another chip and is directed to the current chip ID value of the chip.

7. The method of claim 1, further including:
   in a special operation joining mode, outputting a predetermined end of branch response in response to the assign ID command.

8. The method of claim 7, further including:
   placing the chip in the special operation joining mode when the chip stores a predetermined cleared chip ID value and receives the assign ID command directed to the cleared chip ID value and that also includes a first type acknowledgement.

9. The method of claim 7, further including:
   switching from the special operation joining mode to a normal joining mode in response to receiving the assign ID command that is not acknowledged by another chip of a system.

10. A method for assigning chip identifiers in a multi-chip content addressable memory (CAM) system, comprising the steps of:
    assigning a highest order chip identifier to all CAM chips in the system;
    configuring a current lowest order chip in the system having the highest order chip identifier to accept a lowest order chip identifier as its new chip identifier;
    broadcasting the lowest order chip identifier value to all CAM chips in the system; and
    repeating the configuring and broadcasting steps for an incremental chip identifier value until each CAM chip in the system has a unique chip identifier value.

11. The method of claim 10, wherein:
    the chip identifier for all CAM chips comprises a multi-bit value, and a highest order chip identifier includes all such bits being a "1".

12. The method of claim 10, further including:
    receiving at least one type of predetermined response prior to assigning a chip identifier for all chips of a first branch of a plurality of branches.

13. The method of claim 12, further including:
    receiving a branch complete response that includes the chip identifier of a branching CAM chip that commonly connects a first and second branch, when chip identifiers are assigned to all chips of the first branch.

14. The method of claim 13, further including:
    reassigning a chip ID for the branching CAM chip in response to the branch complete response.

15. A method of assigning chip identification (ID) values to a system that includes a plurality of CAM devices arranged into branches, comprising the steps of:
    returning a branch end response in response to an assign a chip identification (ID) command assigning a chip ID to a last CAM device of one of the plurality of branches.

16. The method of claim 15, wherein:
returning the branch end response includes returning a chip identification ID value of a branching CAM device having a first output connection coupled to a first branch of CAM devices and a second output connection coupled to a second branch of CAM devices.

17. The method of claim 16, wherein:
the chip ID value of the branching CAM device is returned when all CAM devices of the first branch have been assigned unique chip ID values.

18. The method of claim 17, wherein
the chip ID value of the branching CAM device is returned in a predetermined data field of a response data packet.

19. The method of claim 15, further including
acknowledging received assign ID commands differently down a first branch than a second branch while the CAM devices of the first branch are being assigned unique chip ID values.

20. The method of claim 19, further including
acknowledging received chip ID assignment commands identically down a first branch and second branch when the CAM devices of the first branch have been assigned unique chip id values.

* * * * *